June 10, 1969      W. R. SCALF      3,448,676

FOAM MAT DRYER

Filed May 24, 1967

INVENTOR.
WILLIAM R. SCALF

BY Francis W. Anderson
ATTORNEY

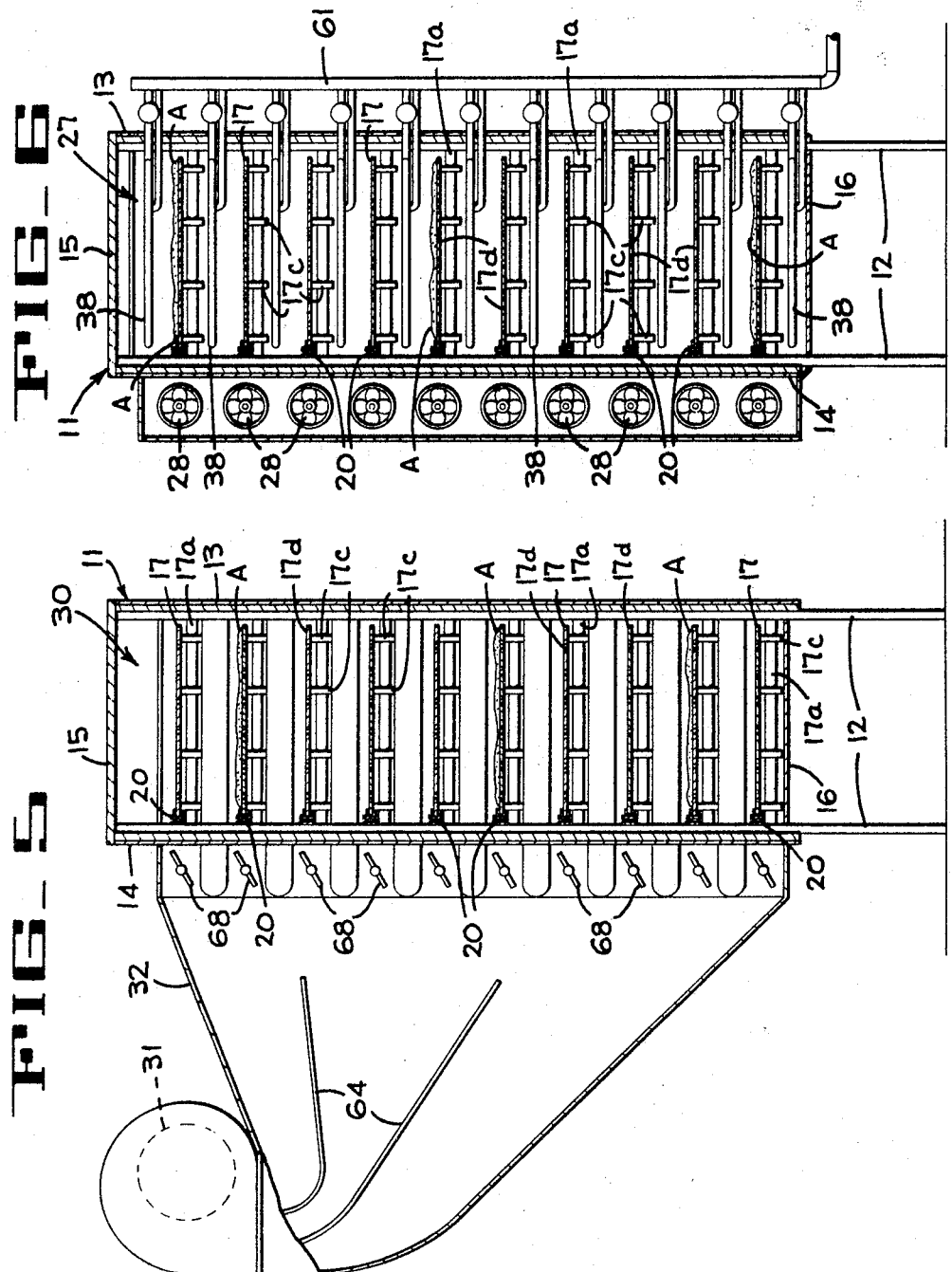

United States Patent Office 3,448,676
Patented June 10, 1969

3,448,676
FOAM MAT DRYER
William R. Scalf, Richmond, Ind., assignor to FMC Corporation, San Jose, Calif., a corporation of Delaware
Filed May 24, 1967, Ser. No. 643,797
Int. Cl. A23b; F26b *19/00*
U.S. Cl. 99—246              8 Claims

ABSTRACT OF THE DISCLOSURE

A dryer for foam mat material drying having an enclosed housing for a plurality of circular coaxially arranged dryer conveyors, wherein each of the conveyors is perforated and powered to rotate through drying and cooling sections of the housing, and wherein dry foam material is continuously removed from all the plurality of conveyors.

BACKGROUND OF THE INVENTION

Foam mat drying for food products has been attempted and a process for such foam mat drying has been disclosed in Ginette et al., U.S. Patent 2,981,629, issued Apr. 25, 1961. However, it has been found desirable to provide apparatus for foam mat drying so that commercial quantities of food foam can be dehydrated.

SUMMARY OF THE INVENTION

The invention relates to an enclosed housing for one or more perforated circular conveyors, wherein foam material is deposited upon said conveyor or conveyors, and as the circular conveyors are driven within the housing, the foam material is sequentially dried, cooled and removed from the conveyor or conveyors. Thus the drying process is continuous upon each conveyor.

DESCRIPTION OF THE DRAWINGS

FIGURE 5 is a sectional elevation taken at 5—5 of FIG. 2 and

FIGURE 6 is a sectional elevation taken at 6—6 of FIG. 2.

DESCRIPTION OF THE PREFERRED EMBODIMENT

In general, foam-mat drying relates to dehydration of a food material or the like by first forming the material into a foam by incorporation of a gas and a foam-stabilizing agent, as described in U.S. Patent 2,981,629. The foam mat material is then spread on a conveyor surface and dried by hot air or the like. The final product is low in moisture content, extremely porous, and is capable of being rehydrated rapidly for use. Many materials are susceptible of foam mat drying as can be seen by the listing of materials in U.S. Patent No. 2,981,629.

In the present invention, drying of the foam mat material takes place within an enclosed housing, wherein a perforated conveyor or conveyors convey the foam mat material through a plurality of drying stages of the housing to conveniently and efficiently dry the foam mat material, and wherein the dried material is also cooled within said housing to facilitate removal of the dried material from the conveyor or conveyors as by scraping or the like.

Figure 1:
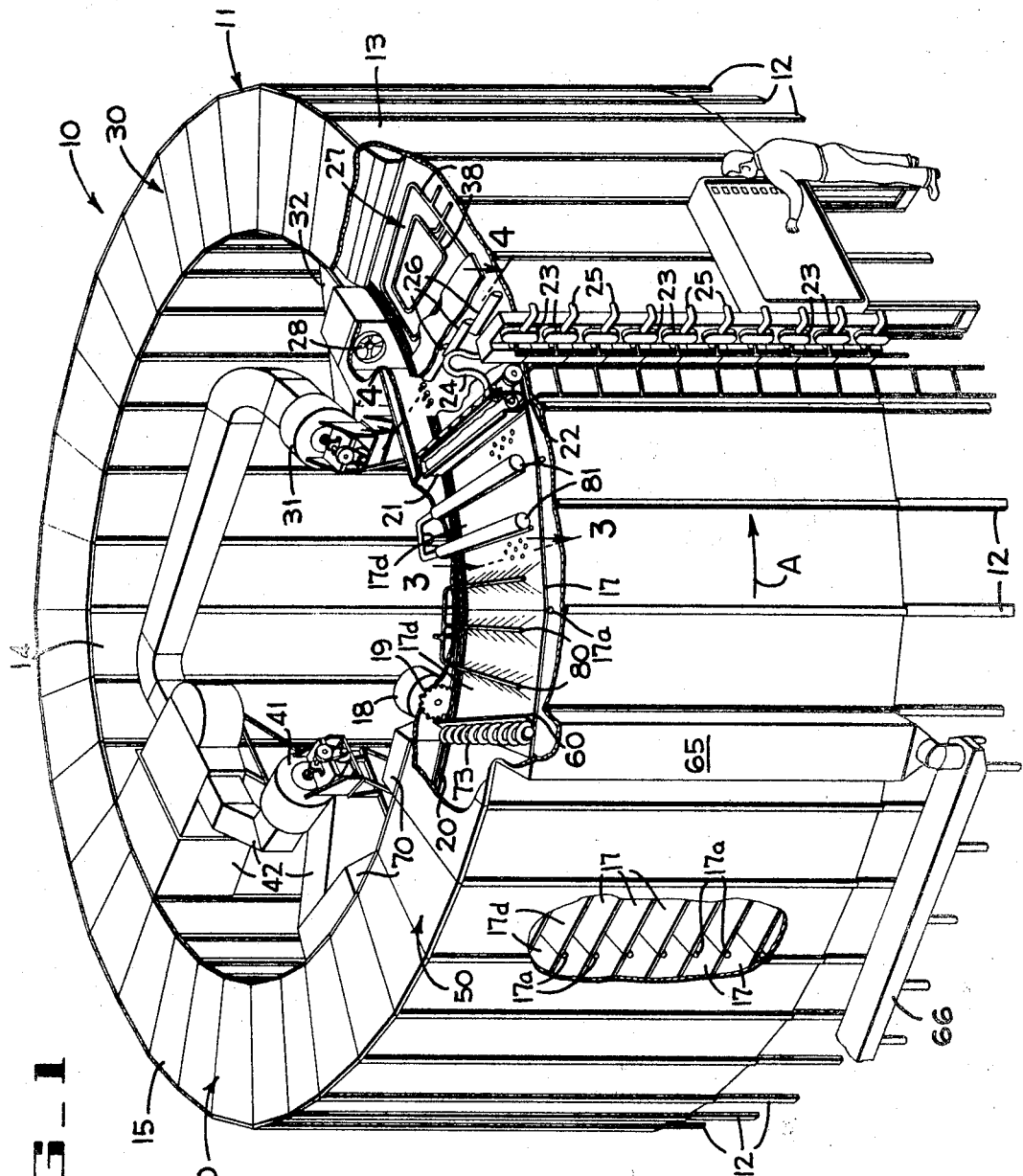
FIGURE 1 is a perspective of the foam-mat dryer of the invention.

Reference is made to FIGURE 1 wherein a foam mat dryer 10 is shown having an enclosed housing 11 supported on a plurality of members 12. The housing 11 primarily consists of an outer metallic enclosure 13, inner metallic enclosure 14, and a top and bottom enclosure 15 and 16 respectively. Within the housing 11 are a plurality of superposed, annular conveyors 17 mounted for movement in a circular path on rollers 17c (FIG. 5). The rollers are rotatable on rods 17a that extend between opposed walls of the housing and are mounted therein in fixed, spaced relation. Each conveyor is made up of a plurality of generally rectangular plates 17d, the forward edge of each plate being disposed close to the rear edge of the adjacent plate.

The conveyors 17 are each driven by a motor 18 through a sprocket 19 and chain 20. The chain 20 is attached to the side edge of each plate 17d of the conveyor 17, and the conveyor 17 is driven in a counterclockwise direction as viewed in the drawings and indicated by arrow A. It would also be possible to drive all conveyors from a single power source, but it has been found advantageous to be able to stop one or more of the conveyors for repairs or the like.

Foam material to be deposited on the perforated conveyor 17 is deposited from a trough 21 through a longitudinal opening 22. Foam material that has already been treated by a gas and a foam stabilizing agent is fed to the troughs 21 through pumps 23 and conduits 24. The input conduits 25 supply foam mat material to the pumps 23 from a source not shown.

Figure 3:
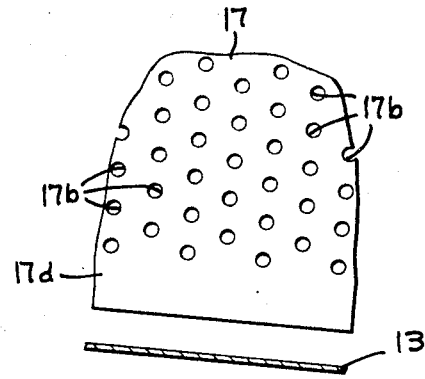
FIGURE 3 is an enlarged plan view of a portion of the conveyor of FIG. 1 taken along line 3—3 of FIG. 1.

In the preferred embodiment, the conveyors 17 are made of stainless steel and are perforated with openings 17b as shown in FIG. 3.

Figure 4:
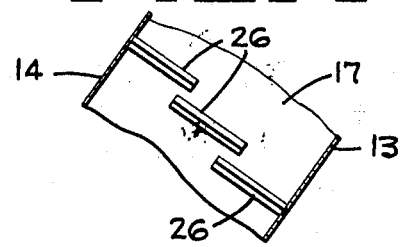
FIGURE 4 is an enlarged plan view of cratering nozzles taken along line 4—4 of FIG. 1.

As the foam material is deposited on the perforated conveyor 17 from the opening 22 in trough 21, it moves with the conveyor over a plurality of air discharge tubes 26. Air discharging from the tubes 26 passes through the perforations 17b of the conveyor 17 to "crater" the foam material deposited thereon, substantially as described in Patent No. 2,981,629. The air discharge tubes 26 are individually supported and are staggered as shown in FIG. 4 so that air is discharged through the perforations along the entire width of the conveyor.

The net result is that the layer of foam material is perforated or "cratered," and such perforated or "cratered" foam is in prime condition for dehydration as the amount of surface area has been increased many times by the cratering. For example, a ⅛ inch thick layer of foam material is cratered to expand to ⅜ inch thickness.

The cratered foam mat is conveyed by rotation of conveyor 17 by motor 18 to a first stage heating section 27 of the dryer housing 11, which consists of a plurality of heating pipes 38 arranged adjacent said perforated foam mat A. Air heated by the heating pipes 38 is circulated over the cratered foam mat by blowers 28. The drying air temperatures in the first stage heating section are approximately 200–250° F.

The material as initially dried at section 27 is conveyed by continued rotation of conveyor 17 to a second stage drying section 30, which extends for approximately 150° of the circumference of the housing. As the foam mat material A passes through section 30, more heated air is passed over the foam mat by blower 31 and duct 32 to continue the drying process. The drying air temperature in the second stage drying section is approximately 150°–200° F., with an air velocity of about 200 feet per minute.

In the third stage drying section 40, heated air is passed over the foam mat material on the rotating conveyor by blower 41 and duct 42 in a direction counter to the direction of rotation of the conveyor 17, with the drying air temperature being in the range of 100°–160° F. at a velocity of about 100 feet per minute.

In general, the residence of the foam material in the various drying sections will depend upon the nature of material being dried and the nature of the environmental atmosphere. In the preferred embodiment the conveyors 17 rotate at approximately 4 feet per minute, but the speed of rotation can also be varied depending upon drying variables and the like.

Finally, the foam mat material is exposed to cool air at the cooling section 50. Cooling of the foam material assists in eliminating "tackiness" of the material to facilitate removal of the material from the conveyor 17 by a doctor blade 60 and screw conveyor 73.

The screw conveyor 73 is rotated to remove the material loosened by doctor blade 60 in a direction substantially transversely of the surface of the conveyor 17. The particles of material thus removed from the conveyor falls through duct 65 and is collectable in a hopper 66.

It should be noted that the cylindrical housing 11 of the preferred embodiment encloses a plurality of conveyors 17, and as can be seen in FIG. 5 ten conveyors 17 are enclosed. Each of the conveyors 17 is individually driven as by motors 18 through sprockets 19 and chains 20 to provide maximum flexibility of use at one or more of the conveyors. In the preferred embodiment, the motors 18 are located near the blade 60 so that conveyors drive is adjacent the scraping and removal of the foam from the conveyor 17.

FIGURE 6 discloses a section taken at the first stage heating portion of the housing 11 to reveal the steam piping 38, for heating the enclosure at the beginning of the foam drying. The steam piping 38, fed from a steam header 61, is located adjacent each conveyor 17, so that the foam mat material on each conveyor 17 is heated for drying the foam mat material already cratered by the air outlets 26 as hereinbefore described. Individually powered fans 28 circulate the air heated by the steam pipes and pass it over and under the conveyors to accelerate the drying of the foam mat material during its residence in the first stage portion.

In the second stage heating portion, heated air from a blower 31 is passed within the housing and over the foam mat material on the ten conveyors. Baffles 64 help deflect the heated air, which is further directed by movable vanes 68 adjacent the edge of each conveyor 17 as shown in FIGURE 3.

During third stage heating the heated air is passed counter to the direction of rotation of the conveyors as by blower 41 through duct work 42.

Figure 2:
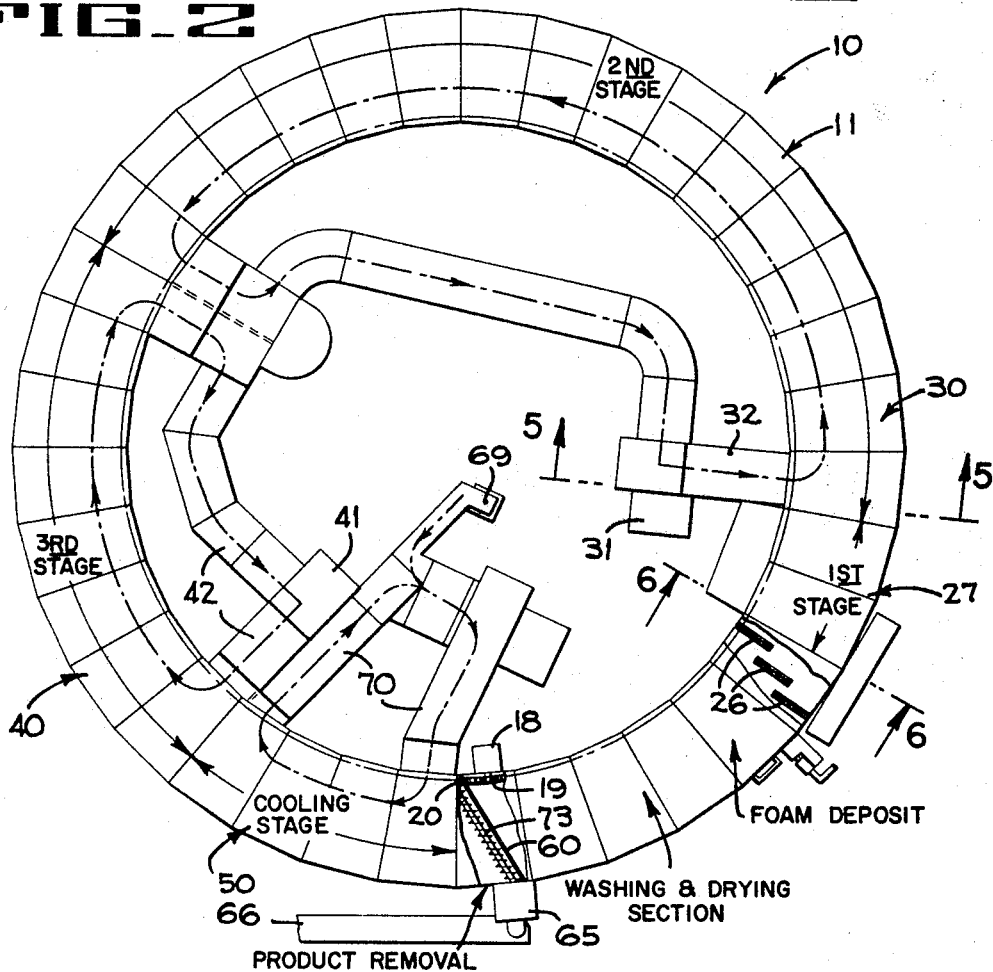
FIGURE 2 is a schematic plan view of the dryer of FIGURE 1.

In the cooling stage, refrigerated air is passed over the conveyors 17 by blower 69 (FIG. 2) and ducts 70 to cool the dried foam mat material and to facilitate removal by blade 60.

The foam mat material removed from the conveyors 17 by doctor blade 60 and screw conveyor 73 falls through duct 65 and is collected in hopper 66.

After the material has been removed by the doctor blade 60, the conveyors 17 rotate through a cleaning portion wherein any residue of foam material is cleaned from the perforated conveyors 17 by high velocity water jets 80 followed by drying of the conveyor by compressed air from discharge units 81.

Thus I have described a foam mat dryer having an enclosed housing for a plurality of circular conveyors for the reception of foam mat material and wherein the foam mat material is efficiently and effectively dried for easy removal therefrom. The drying is continuous as long as foam material is fed to the conveyors, and the conveyors are rotated through the various drying and cooling sections of the housing.

What is claimed is:

1. Apparatus for dehydrating foam material comprising an enclosed housing, a plurality of perforated circular conveyors mounted within said enclosed housing wherein each conveyor is substantially parallel to the other of said plurality of conveyors, means for rotating said circular conveyors within said housing, said housing being provided with openings therein to allow drying air to pass over said conveyors during rotation thereof within the housing, means for depositing said foam material on each conveyor during rotation thereaof, means for cratering said foam on said rotating conveyors, means for drying said foam material, and means for removing said foam material from said rotating conveyor.

2. A drying apparatus for foam material comprising an annular conveyor having a perforated surface, means for rotating said conveyor about a central axis substantially normal to the perforated surface of said conveyor, a housing having an annular shape for enclosing said annular conveyor and wherein drying and cooling mediums are directed over the conveyor within predetermined portions of the housing, means for supplying a foam material to said conveyor during rotation thereof, means for cratering said foam material on said conveyor, drying medium supply means located in a central opening of said annular housing for directing a drying medium over the the conveyor within a predetermined portion of the housing, cooling medium supply means located in a central opening of said annular housing for directing a cooling medium over the conveyor within a predetermined portion of the housing, and means for removal of said foam material in a dehydrated condition from the conveyor during rotation thereof.

3. Apparatus for dehydrating a food in the form of a foam, comprising a circular conveyor means provided with a central circular coaxial opening therethrough, means located within said circular opening for rotating said circular conveyor about a central axis normal thereto, said circular conveyor having a plurality of perforations therethrough, means for depositing food in the form of a foam on said circular conveyor for rotation therewith, means adjacent said circular conveyor for delivering a fluid medium through some of said perforations to crater said foam as said foam is rotated with said conveyor, a housing for enclosing said conveyor, said housing being provided with openings therein to provide for admission and discharge of drying and cooling air, blower means connected to said housing by duct means at said openings for circulating said drying and cooling air relative to said foam on said conveyor at predetermined portions of said housing, and foam removal means adjacent one portion of said conveyor for removing dehydrated food foam therefrom.

4. The apparatus of claim 3 including means for cleaning and drying said rotating conveyor after the removal of dried food foam therefrom and prior to the depositing of additional food in the form of a foam on said conveyor.

5. The apparatus of claim 3 wherein a plurality of circular conveyors are rotatably supported within said housing in a substantially coaxial and parallel manner, and wherein said food in the form of a foam is deposited, dried and removed from each of said plurality of conveyors.

6. The apparatus of claim 5 wherein said food in the form of a foam is continuously deposited and removed from said plurality of conveyors.

7. An apparatus for dehydrating foam comprising a housing, a conveyor positioned within the housing and having a perforated surface that follows a circuitous path on a horizontal plane therein, means positioned at a station along the circuitous path for applying foam to the perforated surface of the conveyor, means located at a subsequent station along the circuitous path for discharging air through the perforated surface of the conveyor and thereby cratering the applied foam, means for drying the applied foam as the conveyor travels along the circuitous path within the housing, and means for removing the dried foam material from the conveyor.

8. An apparatus as described in claim 7 including a plurality of conveyors positioned within the housing in superposed relationship, each conveyor having a perforated surface that follows a circuitous path in a separate horizontal plane within the housing, means positioned at the same station along the circuitous path of each conveyor and aligned in a vertical section for applying foam to the perforated surface of each conveyor, means located at a subsequent station along the circuitous path of each conveyor and aligned in a vertical section for discharging air through the perforated surface of each conveyor and thereby cratering the foam applied thereon, means aligned in a vertical section over each conveyor at a subsequent station for drying the applied foam, and means aligned in a vertical section over each conveyor for removing the dried foam material therefrom.

References Cited
UNITED STATES PATENTS

| | | | |
|---|---|---|---|
| 2,981,629 | 4/1961 | Ginnette | 99—206 |
| 3,263,337 | 8/1966 | Sjogren | 99—204 |

ROBERT W. JENKINS, *Primary Examiner.*

U.S. Cl. X.R.

34—217; 99—199